United States Patent [19]

Gentile

[11] Patent Number: 5,089,949
[45] Date of Patent: Feb. 18, 1992

[54] HIGH EFFICIENCY PASSIVE COMPONENT VOLTAGE CONVERTER

[75] Inventor: Peter D. Gentile, N. Merrick, N.Y.

[73] Assignee: Grumman Aerospace Corporation, Bethpage, N.Y.

[21] Appl. No.: 572,552

[22] Filed: Aug. 27, 1990

[51] Int. Cl.⁵ .............................................. H02M 7/06
[52] U.S. Cl. ........................................ 363/126; 363/53
[58] Field of Search ................ 363/64, 125, 126, 52, 363/53, 62, 63; 320/1; 307/110

[56] References Cited

U.S. PATENT DOCUMENTS

| | | | |
|---|---|---|---|
| 3,743,914 | 7/1973 | Holz | 320/1 |
| 4,207,516 | 6/1980 | Babcock | 323/9 |
| 4,672,290 | 6/1987 | Ghosh et al. | 318/817 |
| 4,685,046 | 8/1987 | Sanders | 363/89 |
| 4,860,184 | 8/1989 | Tabisz et al. | 363/17 |

OTHER PUBLICATIONS

Thom, Douglas, Capacitor Drops Voltage With Little Heat for Low-Cost, Low Voltage Power Supply, *Electronic Design*, p. 24, 11/22/1975.

Primary Examiner—Peter S. Wong
Attorney, Agent, or Firm—Pollock, VandeSande & Priddy

[57] ABSTRACT

A circuit configuration is presented which utilizes diodes, polarized capacitors and a bipolar capacitor to yield a high voltage AC to low voltage DC converter that is virtually free of EMI and which generates little real heat power. This is accomplished by assuring that the voltage reduction circuit components retain the leading current (phase shift) characteristic inherent in capacitive devices. By accomplishing this, the heat dissipation is limited to the product of the current and voltage multiplied by the cosine of the angle between them.

1 Claim, 1 Drawing Sheet

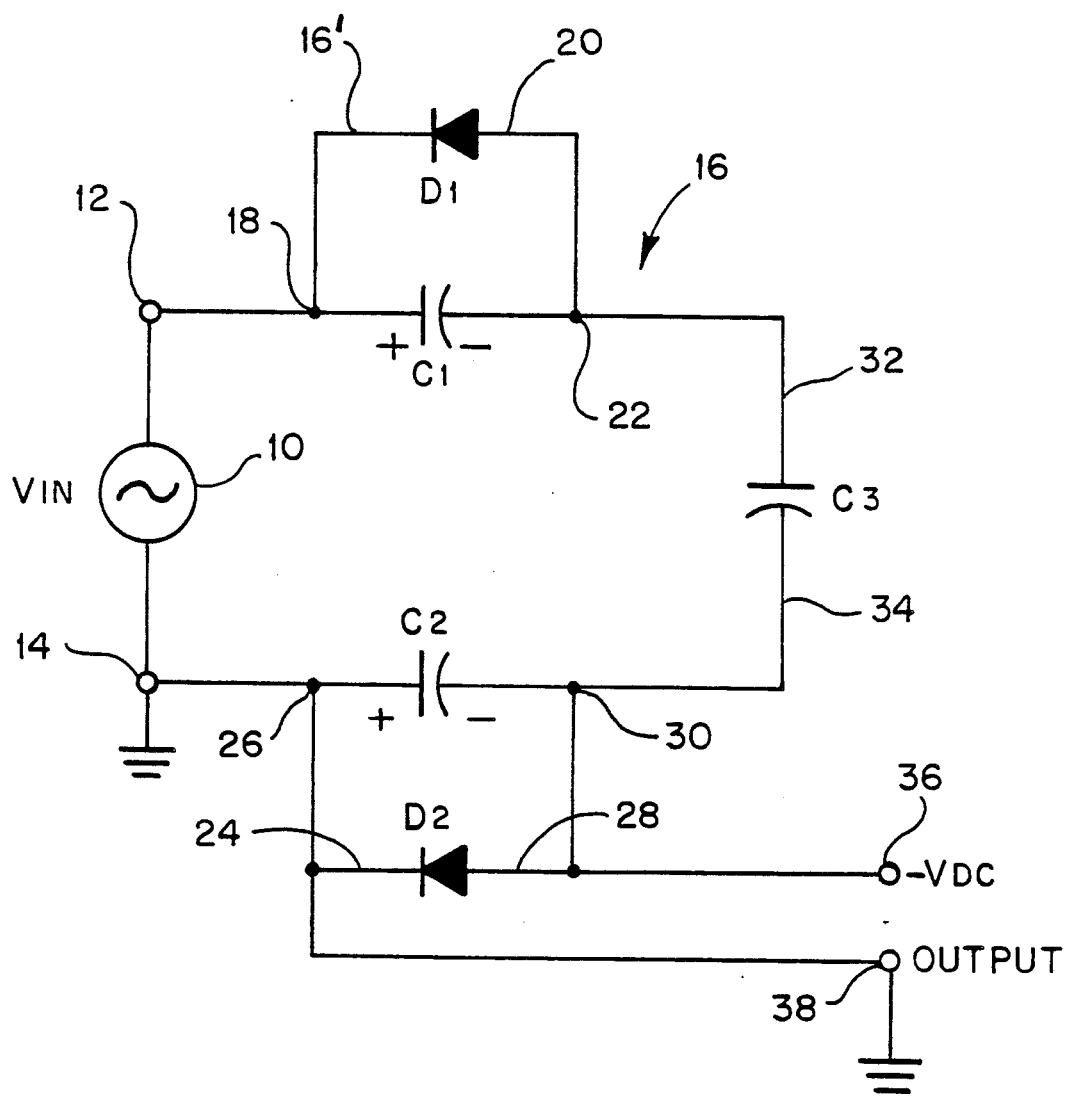

HIGH EFFICIENCY PASSIVE COMPONENT VOLTAGE CONVERTER

FIELD OF THE INVENTION

The present invention relates to voltage converters, and more particularly to an AC-DC converter employing capacitive impedance devices in conjunction with diode rectifiers.

BRIEF DESCRIPTION OF THE PRIOR ART

In the prior art, AC voltage conversion into DC voltage is normally accomplished by utilizing techniques which vary little from the basic configuration of a voltage amplitude conversion device which is coupled with a full wave or half wave rectifier. Conventional applications applied to these basic elements incorporate additional waveform conditioning that is normally accomplished by: a storage capacitor, broadband filters, and active transducer regulator circuitry. The end result is a power supply capable of use in power or sensitive electronic equipment applications.

Although the advent of switching power supplies has added an improved factor of transformer efficiency, the basic voltage conversion scheme remains the same. That is, an inductive device or a resistive voltage dropping component coupled with a diode, or diodes, or other rectification devices, accomplish the AC-DC voltage waveform amplitude conversion.

Typically, each power/voltage conversion circuit configuration applies to a specific application for which the advantages are maximized and the disadvantages minimized. All power conversion designs have undesirable side effects resulting from the circuitry or components utilized. These effects are compensated for by the addition of other circuit components or hardware. The disadvantages of typical prior art approaches may be summarized as follows:

1. Power dissipation of the conversion network components generates heat, resulting in high operating temperature of the circuit components, thus requiring the addition of heat sinks or cooling equipment.

2. Electro-magnetic interference, caused by high magnetic fields, produced by transformer devices and high frequency content generated by switching power supply circuits require shielding and/or filtering.

3. Power conversion applications are a compromise of weight, volume, and power output ratios, the most significant being the power density factor of a particular package. Because component life is a direct factor of operating temperature, equipment life and reliability are direct results of the power density factor. The lower the power density, the better the reliability and the longer the life.

Although power conversion technology has advanced considerably over the years, there is need for improvement. Ideally, one would like to achieve a power conversion unit which requires no space, dissipates no heat, is 100% efficient, and provides $1 \times 10^{-\infty}\%$ regulation, produces no EMI, and has an infinite lifetime. Although this represents an impossible set of criteria, when treated as goals, the requirements become approachable on an application-by-application basis, maximizing one or two of these goals and compensating for the side effects.

BRIEF DESCRIPTION OF THE PRESENT INVENTION

The present power conversion device is a compromise of the ideal goals set forth above, but is unique in that it provides a combination of these goals as not yet attained.

The present invention is most noteworthy for its low heat dissipation, low power density ratio and virtual absence of detectable EMI.

The significant advantages of the present circuit over conventional configurations reside in the utilization of capacitive components in lieu of inductive components—to accomplish the voltage reduction By utilizing an inherent characteristic of capacitive devices, the normal heating power experienced in resistive devices, and to a lesser degree in transformer voltage conversion applications, is avoided.

The present invention contributes a unique circuit configuration employing: diodes, polarized capacitors, and a bipolar capacitor, yielding a high voltage AC to low voltage DC converter which is virtually free of EMI and generates little real heat power. This is accomplished by assuring that the voltage reduction circuit components retain the leading current (phase shift) characteristic inherent in capacitive devices. By accomplishing this, the heat dissipation is limited to the product of the current and voltage multiplied by the cosine of the angle between them. This application is consistent with established engineering principles and equations for power, namely:

$$Power\ (WATTS) = I \times V \times \cos \Theta$$

where $\cos \Theta$ is the angle between the current and the voltage (also known as the power factor).

Another advantage of the present circuit is the reduction in rating of the capacitor voltage design limit. The circuit appears to function with bi-polar capacitor components which have been underrated by 50%. Utilization of new capacitance materials provides a circuit which is as small as other prior art voltage conversion circuits. The application of the present circuit in a 115 VAC distribution system also provides a finite amount of EMI rejection (filtering) between the input AC voltage terminals due to the high capacitance presented by this circuit.

A typical application for which the present circuit is ideally suited is a voltage converter to power an LED indicator in a 115 VAC multi-service outlet box. This circuit configuration offers advantages over the conventional solution of a resistor voltage dropping component in that the dissipated heat is reduced from one watt (using a 20 milliamp LED) to less than 1/10 watt This solution also avoids the EMI which would be present in a simple neon tube application, as well as the case utilizing a transformer conversion circuit. The circuit avoids the heat generated using an incandescent lamp. Although the LED is not part of this invention, its advantageous application is made possible by the present power conversion circuit.

The present inventive circuit can also be used to solve many power conversion problems where low heat dissipation is required and precision power regulation is not. Simple low voltage (non-regulated) power supplies can be configured by varying the capacitor values for the circuit to meet the specific current requirements of the application. Although many applications are possible, the following list represents applications where the present invention is ideally suited: low voltage battery charger, 115 VAC power indicators, transistor radio external supply, low heat night light, fire alarm power supply, and security/surveillance equipment power supplies. Of course, it should be recognized that, although a voltage of 115 volts is discussed in connection with the present invention, this may be varied to suit other voltage values.

BRIEF DESCRIPTION OF THE DRAWING

The above-mentioned objects and advantages of the present invention will be more clearly understood when considered in conjunction with the accompanying drawing, in which:

the figure is a circuit diagram of the present voltage converter.

DETAILED DESCRIPTION OF THE PRESENT INVENTION

The application of an AC input voltage, for example 115 volts, to the circuit of the present invention as indicated by the figure, produces an output in the form of a pulsating DC voltage suitable for direct DC voltage power applications or for additional filtering for operation of electronic circuitry. Referring to the figure, an AC voltage source 10 is impressed across the input terminals 12 and 14 of the voltage converter circuit generally indicated by reference numeral 16. It is seen to include a first leg comprising parallel connected polarized capacitor C1 and diode rectifier D1. The cathode 16' of the diode rectifier is connected to the positive terminal 18 of the capacitor, the latter-mentioned connection points then being directly connected to input terminal 12. The anode 20 of the diode rectifier is connected with the negative terminal 22 of the polarized capacitor.

A symmetrical connection exists in a second leg of the circuit including diode rectifier D2 and polarized capacitor C2. The cathode 24 of diode rectifier D2 is connected to the positive terminal 26 of polarized capacitor C2. These latter-mentioned connection points are then directly connected to the grounded input terminal 14. The anode 28 of diode rectifier D2 is connected to the negative terminal 30 of polarized capacitor C2. A bi-polar capacitor C3 has its terminals 32 and 34 connected across the symmetrical capacitor-diode rectifier legs, and more specifically to the negative capacitor terminals 22 and 30. The output terminals 36 and 38 (grounded) are connected across the parallel connected polarized capacitor C2 and diode rectifier D2.

When an AC voltage is applied across the input terminals 12 and 14, a DC output voltage is produced across the output terminals 36 and 38 in the form of a pulsating DC voltage. This output voltage is suitable for direct DC voltage power applications or additional conventional filtering may be employed for producing a DC voltage, particularly suited for sensitive electronic circuitry.

In operation of the circuit, the pulsating DC output voltage is the result of a capacitive voltage division which depends upon the various capacitive impedance values in the circuit as well as the rectification effects of the diodes D1 and D2.

If we are to assume the negative portion of a first AC cycle, current flows through C2 and C3 as well as diode D1 for charging C2 and C3 to a voltage defined by:

I. $V_{c2} = C_3 (V \cos wt)/(C_2+C_3)$
   $V_{c2}$ = Apparent voltage across terminals 26 and 30

II. $V_{c3} = C_2 (V \cos wt)/(C_2+C_3)$
    $V_{c3}$ = Apparent voltage across terminals 18 and 16

Upon application of the positive (first) cycle, the AC current flow causes C1 to charge, C2 to reverse charge (to 0.75 volt, C2 not going any further negative because of D2), and C3 reverse charging to $-V_{c3}$.

On the third cycle (and on), the voltage across C1, C2 and C3 are defined as, (at no load):

III. (prior to diode D1 and D2 conduction)
   $V_{c2} = C_1 * C_3 (-V \cos wt + V \sin wt)/(C_1+C_2+C_3)$ IV. (post diode D1 conduction)
   $V_{c2} = C_3 (-V \cos wt + V \sin wt)/(C_2+C_3)$
   $V_{c1} \approx 0$ volts (limited to diode conduction voltage 0.75 volt)

V. (prior to diode D1 and D2 conduction)
   $V_{c3} = C_1 * C_2 (-V \cos wt + V \sin wt)/(C_1+C_2+C_3)$ VI. (post diode D1 conduction)
   $V_{c3} = -V \cos wt$
   $V_{c1} \approx 0$ volts (limited to diode conduction voltage 0.75 volt)

VII. (post diode D2 conduction)
   $V_{c3} = -V \cos wt$
   $V_{c2} \approx 0$ volts (limited to diode conduction voltage 0.75 volt)

VIII. (prior to diode D2 and D1 conduction)
   $V_{c1} = C_2 * C_3 (-V \cos wt + V \sin wt)/(C_1+C_2+C_3)$
   $V_{c1}$ = Apparent voltage across terminals 32 and 34

IX. (post diode D2 conduction)
   $V_{c1} = C_3 (-V \cos wt + V \sin wt)/(C_1+C_3)$
   $V_{c2} \approx 0$ volts (limited to diode conduction voltage 0.75 volt)

On examination of the equations, it is observed that, while capacitor C1=C2, the voltage across C3 remains symmetrical in time and is a function of the summation of the AC waveforms of equations V and VI. The equal and opposite charges summed over a long time interval will equate to zero volts. Thus, the voltage across C3 appears as an AC voltage shifted in time due to the additive and subtractive charging action of the capacitor.

Diodes D1 and D2 serve dual purpose roles: (1) as a rectifier for C2 and C1, respectively; and (2) as voltage (polarity reversal) limiters for C1 and C2, respectively. During conduction, diode D1 acts as a rectifier for capacitor C2 and a voltage limiter for C1. Diode D2 acts as a rectifier for capacitor C1 and a voltage limiter for C2. The combined rectification and limiting results in an output representative of a pulsating DC voltage.

The phase shift of the voltage across C3 contributes to the low heat dissipation of the circuit. The current through C3 is out of phase with the input voltage beyond that of the expected 90 degrees. As a result of the "I * V * cosine" product, the real heat power is minimized in capacitors C1, C2 and C3.

In actual utilization of the circuit, the output load should be selected as a fraction of the input current no load value. When so operating, the above discussion is applicable to the operation of the circuit with minor alteration of the stated equations. Further modification to the circuit may be accomplished by adding a filter/diode blocking stage to the output for making the output usable with electronic circuitry requiring pure DC in lieu of pulsating DC. Further adjustment of the values of C1 and C2 to compensate for the added filter capacitance will retain the advantages of the present circuit configuration.

Thus, by assuring that the voltage reduction circuit components retain the leading current (phase shift) characteristic inherent in capacitive devices, the high voltage AC to low voltage DC converter is virtually free of EMI and generates little real heat power.

It should be understood that the invention is not limited to the exact details of construction shown and described herein for obvious modifications will occur to persons skilled in the art.

I claim:

1. An AC-DC voltage converter free of inductive components and comprising;

first and second AC voltage input terminals;

first and second interconnected polarized capacitors having first terminals of identical polarity connected in circuit to respective input terminals;

a bi-polar capacitor having its terminals connected to second terminals, of identical opposite polarity, of the first and second polarized capacitors; and a diode connected across each of the polarized capacitors for limiting the voltage thereacross and rectifying the voltage impressed upon a polarized capacitor in a symmetrical leg;

the voltage across each polarized capacitor being a pulsating DC signal, one of which serves as an output signal.

* * * * *